Figure 1:
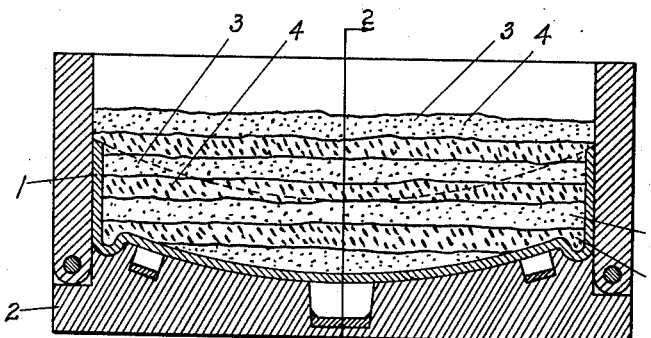

Oct. 20, 1925.

M. R. DE FRANCE

BRAKE SHOE

Original Filed Nov. 10, 1924

1,557,669

INVENTOR
Murrell R. De France
by William B. Wharton
his attorney

Patented Oct. 20, 1925.

1,557,669

UNITED STATES PATENT OFFICE.

MURRELL R. DE FRANCE, OF BELLEVUE, PENNSYLVANIA.

BRAKE SHOE.

Original application filed November 10, 1924, Serial No. 748,863. Divided and this application filed April 18, 1925. Serial No. 24,069.

*To all whom it may concern:*

Be it known that I, MURRELL R. DE FRANCE, a citizen of the United States, residing at Bellevue, in the county of Allegheny and State of Pennsylvania, have invented a new and useful Improvement in a Brake Shoe, of which the following is a specification.

This invention relates to a pressed metal and composition brake shoe for use on railway cars and similar vehicles; and to the composition for filling the shell of such brake shoe; and constitutes a division of my copending application Serial No. 748,863, filed November 10, 1924.

For a long time previous to the present invention a wide variety of substances have been utilized in filling compositions for brake shoes. Among such substances may be noted fibrous asbestos, coke, cement, iron borings, iron ore, plaster, plumbago, rosin, sand, sawdust, wood, and other vegetable fibers. Various oxidizing vegetable oil and various gums have been used as a binder for these dry ingredients. When plaster or cement has been used as an ingredient of the composition, water has been added to set and harden the composition as a whole.

Brake shoes of the general type mentioned, that is brake shoes comprising a shell of pressed metal and a filling of a composition formed of various ingredients, present certain advantages over the cast metal shoes commonly in use. Such advantages reside chiefly in manufacturing economy, which is so great that composition brake shoes would largely displace cast metal shoes if the former performed under all conditions of use in as satisfactory a manner as the cast shoe.

It may be stated in connection with cast iron shoes, that the wear on the face of a cast iron brake shoe is by granulation. Under given pressure and load the friction produced by this shoe on a wheel increases in proportion to the square of pressure until the temperature of the shoe is that of a dull red heat, at which point the friction decreases in direct proportion to the further heat generated. It is to be understood, of course, that under an excessive pressure such as is produced by a stuck brake, a cast metal shoe, or any other brake shoe, would be burned up.

The wearing away of a composition brake shoe is by pulverization as contrasted with granulation. The wear of the composition shoe being by pulverization, the shoe and wheel in time become so highly polished that the contact between the two is almost perfect. When this condition is produced, an excessive friction greater than that specified for the purpose for which the shoe is used is developed. It will be understood that this perfect contact and excesive friction is a condition which is not possible with a brake shoe which wears away by granulation.

It should be understood, also, that the composition which constitute the filling material for pressed shell and composition brake shoes, are very poor conductors of heat. This fact avoids limitation of the friction developed by the shoe, as is the case when a cast metal shoe reaches a red heat.

Previous failure of composition brake shoes to compete successfully with cast metal shoes may be traced to three defects, which had to be overcome in order to render them satisfactory under all conditions of use as the cast shoe. The first problem was to provide a suitable shell, which would not injure the tread of the wheel to which the brake was applied. This defect has been gradually eliminated by experiment and invention. The second problem was the development of a filling composition which would carry the crushing load of braking a wheel, independently of the shell in which the composition is carried. This problem is inherently connected with the first, as its solution was necessary in order to secure a shell which would not injure the tread of a wheel. It has also been successfully solved. The third problem has been the development of a composition filling which would coform to the specifications of railroads for requisite friction and life, and which would also approximate the functioning of a cast metal shoe under all conditions of service and at all times during the life of the shoe.

It is this latter problem which has hitherto remained unsolved, and which at the present time limits the use of composition brake shoes. The disadvantages which must be overcome are those of a wearing by pulverization to result in perfect contact between the brake shoe and wheel with a resultant development of friction in excess of that specified. For this reason the use of composition brake shoes has been limited to freight cars only. For if a composition shoe be placed on passenger cars, it will be found that the heat generated by excessive friction will be beyond the factor of safety in the operation of trains, and that serious injury to the treads of the wheels on such trains will be produced The manufacturers of composition brake shoes have been aware of this defect, and its disastrous consequences in the use of the brake shoes for years, but attempts to remedy this defect have hitherto been ineffective or impractical. During experimental work it was found that the various filling compositions would not develop uniform friction throughout the life of the brake shoe. Thus if the brake shoe was capable of giving the specified requisite friction upon its first application; by the time the shoe was partially worn away, and the shoe and the tread of the wheel to which it was applied had become thoroughly polished, the friction was far beyond the proper specifications. In conducting such work the inventor herein has made and tested composition brake shoes in which the coefficient of friction increased as greatly as thirty per cent during the life of the shoe. Compositions in which the coefficient friction did not increase with use of the shoe varied from an insufficient initial friction to substantially no effective initial friction whatever.

The general object of the invention is therefore to provide a composition filler for a pressed metal shell which will produce a composition brake shoe capable of approximating the effect of a cast metal brake shoe under all conditions of use, and throughout the entire life of the shoe.

One specific object of the invention is to provide a filling composition for a brake shoe in which portions of the filling composition will throughout the life of the shoe wear away more readily than other portions thereof.

An object collateral to the above is to provide a filler for a pressed metal shell having the characteristics noted, which consists of a single integral block of filling composition.

Another specific object of the invention is to provide a filling block of frictional composition which comprises stratified areas of various ingredients possessing different coefficients of friction, such areas being so arranged or stratified that the composition filler presents initially and after it has been partially worn away an effective face having areas with varying coefficients of friction and of varying rapidity of disintegration in use of the brake shoe.

Another object of the invention is to provide a filling composition for a pressed metal shell which comprises a relatively great proportion of a granular heat resisting ingredient.

Figure 2:
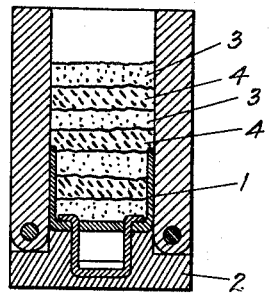
Figure 3:
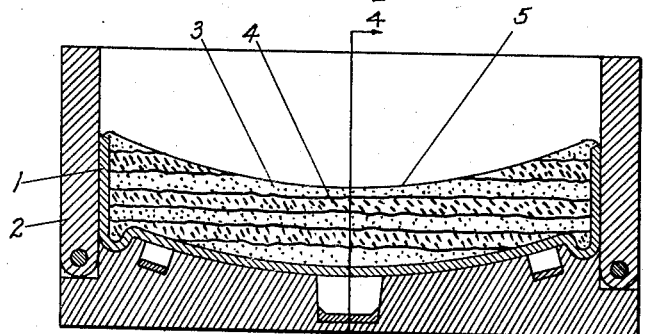
Figure 4:
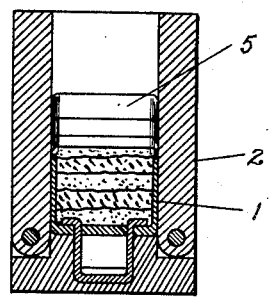
Figure 5:
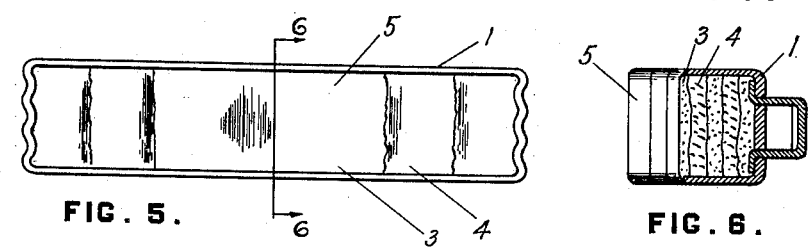
Figure 6:
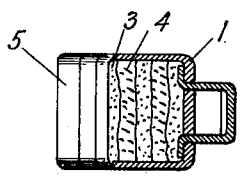
Figure 7:
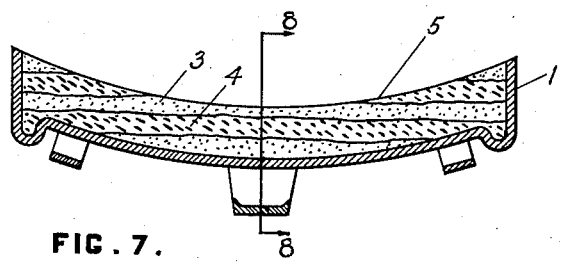
Figure 8:
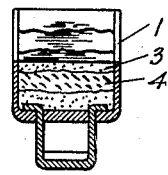

In the accompanying drawings Figure 1 is a vertical sectional view through a mold and brake shoe, illustrating one step in providing a shell with a composition filler according to the present invention; Figure 2 is a cross sectional view on the line 2—2 Figure 1; Figure 3 is a view similar to Figure 1, but showing a more advanced stage of the filling operation; Figure 4 is a cross sectional view on the line 4—4 Figure 3; Figure 5 is a bottom plan view of the completed brake shoe; Figure 6 is a cross sectional view on the line 6—6 Figure 5; Figure 7 is a vertical sectional view through the brake shoe shown in Figures 5 and 6, illustrating the condition of the brake shoe after it has been partially worn away in use; and Figure 8 is a cross sectional view on the line 8—8 Figure 7.

In the manufacture of a brake shoe constituting the subject matter of the present invention, a brake shoe shell 1, of pressed metal, is laid in a mold 2 in the position shown in Figures 1 to 4 of the drawings. Filling composition in a plastic and readily compressible condition is then introduced into the brake shoe shell and the mold, so that the depth of composition is greater than the depth of shell, as shown in Figure 1. As shown in the drawings, composition of two different grades is used to form the filling block of the shoe, the different grades of composition being introduced in alternate horizontal layers or strata 3 and 4 throughout the height of the shell, and for some distance therebeyond in the mold.

The entire body of composition within the mold is then compacted under a relatively high pressure from the position and condition shown in Figure 1 to the position and condition shown in Figure 3. If desired the composition may be given a relatively light initial pressure, and a subsequent heavier pressure, in order to avoid any possibility of disarranging the layers of the different grades of composition. This is, however, in general unnecessary.

As the strata 3 and 4 of the finished block lie horizontally, and as the working face 5 of the block is concave on an arc of relatively great curvature, the pressing operation results in exposing more than one stratum on the working face of the brake shoe. Due to these factors, moreover, more than one stratum or area will be exposed on the working face as the filling block wears away, and throughout the entire life of the brake shoe.

Horizontal stratification of the different grades of composition in the integral block presents an advantage in simplicity or manufacture over the generally similar form, in which the areas, or strata, are vertically arranged.

It should be noted that the brake shoe as completed does not comprise a plurality of separate blocks, which must be interlocked or otherwise mutually secured to each other or must be held in position by a resilient pressure exerted by the brake shoe shell. The block is, as stated, a single integral block, consisting of horizontal stratifications providing areas of composition with different characteristics.

As has been previously stated, at least two formulæ should be employed in providing the composition of the different areas of the filling block. In order to effect the objects of the invention, these formulæ must be such that different areas having at least two different coefficients of friction are provided on the working face of the filling block not only initially but during the entire life of the brake shoe, as the block is worn away in use. It is also highly desirable that the material in one set of areas should tend to be worn away more rapidly than the material in the other set of areas. This is effected in practice by having one or more areas or sets of areas comprise material which tends to pulverization with great rapidity. This effect causes the working face of the block to be constantly covered with loose material, thus preventing perfect contact between the wheel and the area or areas which are less susceptible to disintegration. It is also desirable that a certain ingredient, or certain ingredients, of such area or areas be such as to cause the loose material to be as coarse as possible, thus approximating the effect of a cast metal brake shoe during its wear by granulation.

For purposes of illustration, several practicable formulæ, for use in various areas of the filling block, may be given as follows:

*Formula A.*

(Parts by weight.)

| | Parts. |
|---|---|
| Asbestos sand | 27.00 |
| Vegetable fibre | 10.00 |
| Coke | 13.00 |
| Oil | 5.50 |
| Total | 55.50 |

*Formula B.*

(Parts by weight.)

| | Parts. |
|---|---|
| Asbestos sand | 20.00 |
| Vegetable fibre | 10.00 |
| Flue dust | 20.00 |
| Oil | 5.50 |
| Total | 55.50 |

*Formula C.*

(Parts by weight.)

| | Parts. |
|---|---|
| Asbestos sand | 27.00 |
| Asbestos fibre | 12.00 |
| Coke | 8.00 |
| Metallic borings | 3.00 |
| Oil | 5.50 |
| Total | 55.50 |

*Formula D.*

(Parts by weight.)

| | Parts. |
|---|---|
| Asbestos sand | 27.00 |
| Vegetable fibre | 15.00 |
| Flue dust | 8.00 |
| Oil | 5.50 |
| Total | 55.50 |

It will be noted that a principal ingredient of all the formulæ, is asbestos sand, or granular asbestos. This ingredient has been added to others previously employed because experimentation with this material has demonstrated that it posseses several highly advantageous qualities. Because of its lesser density in mass, asbestos sand may be used in greater volume than silica sand, and may be more uniformly distributed through and among the other ingredients of the composition. It therefore wears off more readily and more uniformly in use of a brake shoe to provide a loose semi-granular layer between the tread of a wheel and the solid working face of the shoe.

The material herein referred to as "asbestos sand" or "granular asbestos" is obtained as screenings in obtaining fibrous asbestos. It is a dust, comprising both powdery and gritty particles, and in its chemical composition comprises silicates of magnesium with some admixture of other silicates. Because of its divided condition granular asbestos has in practical effect no fibrous characteristics.

Asbestos sand has all the heat resisting, and abrasive, qualities of silica sand; together with an equal or greater load carrying capacity or resistance to crushing. While the cost of asbestos sand is greater than that of silica sand, its use is more economical because it may be used in far greater volume to displace the still more expensive ingredients of a composition, such as fibrous asbestos, coke, and cement.

It will be noted that all the formulæ, comprise asbestos sand in a proportion in excess of thirty per cent by weight of the total composition. This means that it constitutes a far larger proportion by volume of the composition. In this connection it should be understood that fibrous asbestos creates a greater friction than does granular asbestos. This is because the fibrous asbestos tends to become polished on the working face of the brake shoe, while the granular asbestos tends to grain off to form the finely granular friction modifying layer on the working face of the brake shoe.

Thus the formula A comprises a relatively large percentage of granular asbestos, while the formula B comprises a lesser percentage of granular asbestos and a greater percentage of fibrous material. When, therefore, a filling block is formed of two grades of composition according to the formula A and B, the areas of composition according to formula B are the friction increasing and wear resisting areas and the areas of the composition according to formula A are the areas of rapid disintegration and friction modifying granulation.

When, however, the filling block comprises areas formed according to the more highly frictional formulæ C or D, either A or B, according to the specification to be complied with, may be used in the rapidly disintegrating and friction modifying areas.

It should be understood that the formulæ given above are illustrative only, and that various other ingredients and proportions may be employed to comply with the specifications for which each brake shoe is made. It is also to be noted that while areas composed of only two grades of composition are shown in the drawings, three or more grades may be incorporated in a single filling block, if this should prove in any instance desirable.

It should be further understood that composition filling blocks for pressed metal shells may be made by pressing the bodies of the different grades of composition together in a mold apart from the shell. This block may be then separately baked, and the metal shell folded and pressed around the integral block of filling composition.

In order to press the block separately from the shell, it is necessary only that the inner contour of the mold be made to conform to the inner rather than the outer contour of the shell in which the filling block is to be used.

What I claim is:

1. In a brake shoe comprising a pressed metal shell and a composition filler therefor, an integral block of filling composition stratified horizontally into areas having different coefficients of friction.

2. In a brake shoe comprising a pressed metal shell and a composition filler therefor, an integral block of filling composition stratified horizontally into areas having different coefficients of friction, the composition in certain of such areas comprising granular asbestos as one of its principal ingredients.

3. In a brake shoe comprising a pressed metal shell and a composition filler therefor, an integral block of filling composition stratified horizontally into areas having different rates of disintegration in use of the brake shoe.

4. In a brake shoe comprising a pressed metal shell and a composition filler therefor, an integral block of filling composition stratified horizontally into areas having different rates of disintegration in use of the brake shoe, the composition in certain of such areas comprising granular asbestos as one of its principal ingredients.

In witness whereof, I hereunto set my hand.

MURRELL R. DE FRANCE.